US009656154B1

(12) United States Patent
Rodriguez

(10) Patent No.: US 9,656,154 B1
(45) Date of Patent: May 23, 2017

(54) SPORTS FIELD MARKING SYSTEM

(71) Applicant: Martin Rodriguez, Lehigh Acres, FL (US)

(72) Inventor: Martin Rodriguez, Lehigh Acres, FL (US)

( * ) Notice: Subject to any disclaimer, the term of this patent is extended or adjusted under 35 U.S.C. 154(b) by 155 days.

(21) Appl. No.: 14/826,084

(22) Filed: Aug. 13, 2015

(51) Int. Cl.
*G01C 15/02* (2006.01)
*A63C 19/06* (2006.01)
*G01C 3/08* (2006.01)

(52) U.S. Cl.
CPC .............. *A63C 19/062* (2013.01); *G01C 3/08* (2013.01)

(58) Field of Classification Search
CPC .................................. A63C 19/06; G01C 3/08
USPC ..................... 33/286, 289, DIG. 21
See application file for complete search history.

(56) References Cited

U.S. PATENT DOCUMENTS

| | | | | |
|---|---|---|---|---|
| 3,741,662 A * | 6/1973 | Pioch | ...................... | A63B 71/06 33/289 |
| 6,012,228 A * | 1/2000 | Fisanich | ................... | G01B 3/11 33/289 |
| 6,907,840 B1 * | 6/2005 | Gaines | ................ | A63B 71/0605 116/222 |
| 6,976,928 B2 * | 12/2005 | Hemphill | ................ | A63B 71/06 33/289 |
| 7,770,297 B1 * | 8/2010 | Sommerfeld | ....... | A63B 24/0021 33/289 |
| 8,220,170 B1 * | 7/2012 | Winckler | .............. | G01C 15/004 33/289 |
| 2004/0111903 A1 * | 6/2004 | Amron | .................. | G01C 15/004 33/289 |
| 2004/0111904 A1 * | 6/2004 | Amron | .................. | G01C 15/004 33/289 |
| 2004/0111905 A1 * | 6/2004 | Amron | .................. | G01C 15/004 33/289 |
| 2004/0200082 A1 * | 10/2004 | Dinicola | .............. | G01C 15/004 33/289 |
| 2007/0062053 A1 * | 3/2007 | Walser | ................. | G01C 15/004 33/286 |
| 2008/0034598 A1 * | 2/2008 | Boccardi | ............ | A63B 71/0605 33/289 |
| 2014/0259708 A1 * | 9/2014 | Foster | ................. | A63B 71/0605 33/289 |
| 2015/0113842 A1 * | 4/2015 | Suhr | ...................... | A63C 19/00 40/559 |

* cited by examiner

*Primary Examiner* — G. Bradley Bennett
(74) *Attorney, Agent, or Firm* — Gulf Coast Intellectual Property Group

(57) ABSTRACT

A sports field marking system that is operable to measure and provide the location required on a field where a football must be advanced to in order to achieve a first down during play of a conventional football game. The sports field marking system includes a first down marker pole placed on a sideline of a football field with a second first down marker pole being placed in axial alignment with the first down marker pole on the opposing sideline. The first down marker pole and second down marker pole include laser emitters operable to project a visible light beam across the surface of the field of play. A down display marker pole is provided and is placed in axial alignment with the first down marker pole on the same sideline. A first laser rangefinder and a second laser rangefinder are mounted to the down display marker pole.

17 Claims, 2 Drawing Sheets

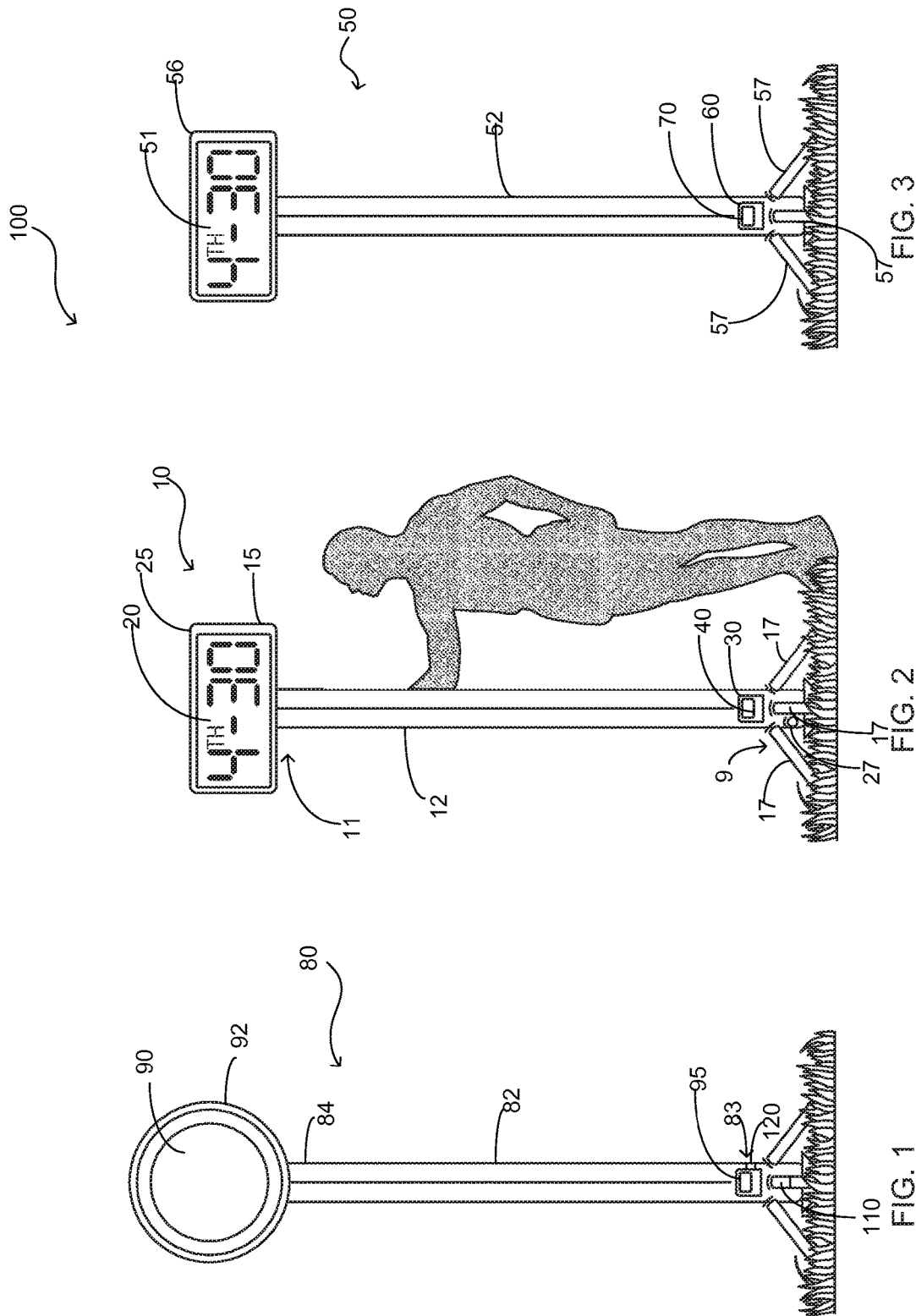

SPORTS FIELD MARKING SYSTEM

PRIORITY UNDER 35 U.S.C SECTION 119(E) & 37 C.F.R. SECTION 1.78

This nonprovisional application claims priority based upon the following prior United States Provisional patent application entitled: Sports Field Marker, Application No.: 62/038,289 filed Aug. 17, 2014, in the name of Martin Rodriguez, which is hereby incorporated by reference for all purposes.

FIELD OF THE INVENTION

The present invention relates generally to sports regulation enforcement, more specifically but not by way of limitation, a system that is operable to provide accurate measurement and display the position of a football during the playing of a football game and further provide a visual photo-beam highlighting the location of the required position needed to achieve a first down.

BACKGROUND

Football is one of the most popular sports in the United States. The sport is played at all levels beginning in youth leagues with players as young as six years old and extends to the professional football leagues such as but not limited to the National Football League. As is known in the art, during a game of football, two teams field eleven players with one team having offensive possession of the football and the opposing team being defensive with the offensive possession team being provided four plays to achieve a gain of ten yards in order to receive a subsequent set of downs. The offensive team's objective is to move the position of the football down the field in order to score a touchdown or field goal while the defensive team acts to inhibit the progress of the offensive team.

During the offensive possession, the football is marked intermediate each down during advancement towards the first down marker. As the team executes subsequent downs the down being executed is displayed, i.e. a referee will display on a post what down is being played. Another pair of referees are used to operate what is commonly referred to as the chains. The chains includes two poles and a chain operably coupled intermediate the two poles with the chain being exactly ten yards long. The lead pole is used to provide a visual reference as to where the offensive team needs to move the football to in order to achieve a subsequent set of downs.

One problem with the conventional method as described herein for displaying downs and measuring for the achievement of a first down is accuracy. While the chains do provide a visual reference on the sideline, the fact that it is located on the sideline makes it difficult for a player to accurately see where the first down marker is located. Additionally, the present system does not provide on the sideline exactly how many yards are needed in order to achieve a first down.

Accordingly, there is a need for a sports field marking system that provides a visual indicator superposed across the width of the field and further is operable to provide accurate location information of the football relative to the required position for achievement of the first down.

SUMMARY OF THE INVENTION

It is the object of the present invention to provide a sports field marking system for the game of football that is operable to provide accurate location display of the required first down yardage position that includes a first marker pole, a second marker pole and a third marker pole that are positioned on the field of play in particular the sideline area.

Another object of the present invention is to provide a sports field marking system that is operable to accurately identify the position of the football during play of a football game that includes a plurality of transceivers operably coupled to the first marker pole, second marker pole and third marker pole.

A further object of the present invention is to provide a sports field marking system that provides accurate identification of the position required to achieve a first down utilizing a light beam superposed on the field of play.

Still another object of the present invention is to provide a sports field marking system that includes digital display screens on at least two of the aforementioned marker poles.

An additional object of the present invention is to provide a sports field marking system further including controllers operably coupled to the marker poles wherein the controllers includes the necessary electronics to receive, store, manipulate and transmit data in order to provide operation of the sports field marking system.

Yet a further object of the present invention is to provide a sports field marking system wherein at least one of the poles includes a measuring unit that is utilized to identify the position of the football in relation to the marker pole that is operable to identify the location required for a first down.

Still another object of the present invention is to provide a sports field marking system that is operable to provide accurate display of the yardage required to achieve a first down wherein two of the marker poles are positioned on opposing sides of the field.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 1 is a perspective view of a down display marker pole of the present invention; and FIG. 2 is a perspective view of the first down marker pole of the present invention; and FIG. 3 is a perspective view of the second first down marker pole of the present invention.

DETAILED DESCRIPTION

Figure 4:
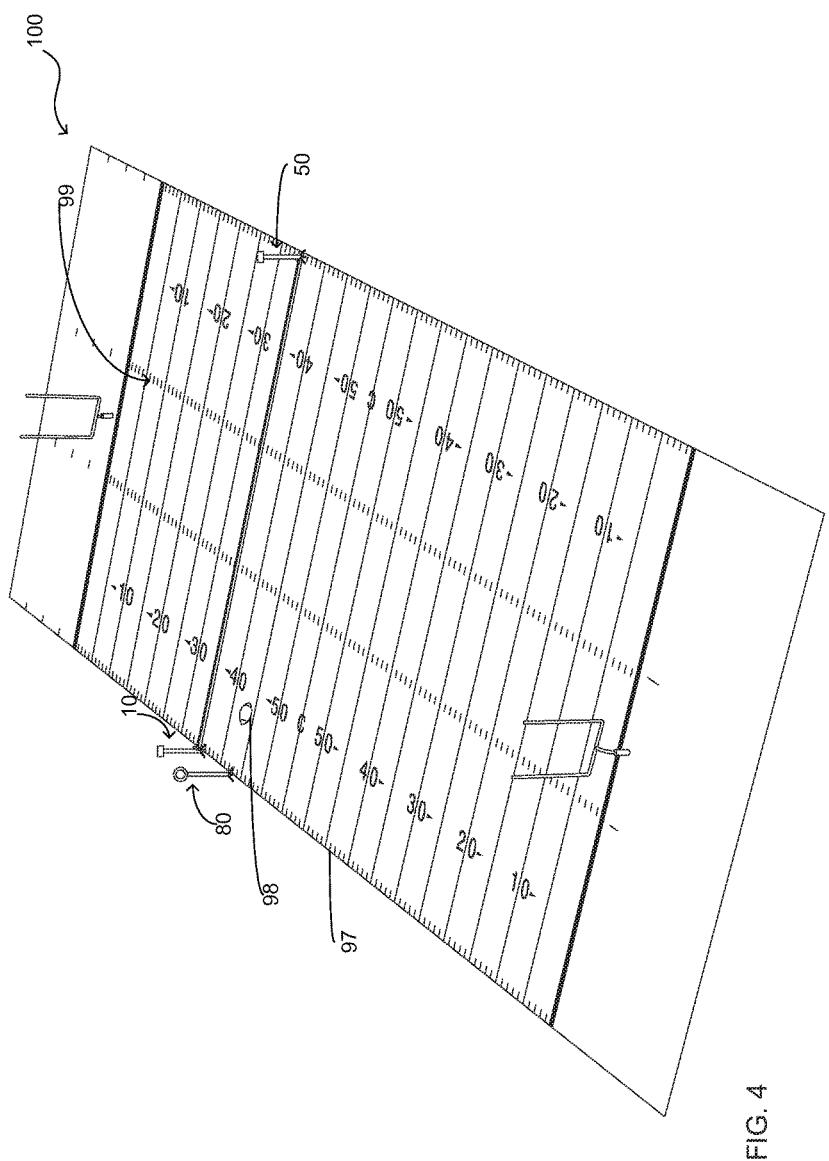
FIG. 4 is a perspective view of a football field with the elements of the present invention disposed thereon.

Referring now to the drawings submitted herewith, wherein various elements depicted therein are not necessarily drawn to scale and wherein through the views and figures like elements are referenced with identical reference numerals, there is illustrated a sport field marking system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to FIG. 2, the sports field marking system 100 includes a first down marker pole 10 that includes a body 12 that is elongated in manner having a first end 9 and a second end 11. The body 12 is manufactured from a suitable durable material such as but not limited to fiberglass or plastic and is substantially hollow. Superposed the body 12 adjacent to the second end 11 is display screen 20. Display screen 20 is a conventional LCD display screen that is contained in housing 25. Although only one side of the display screen 20 is illustrated herein the display screen 20 is a dual-sided display screen so it is operable to display indicia to both players on the field 99 and attendees of a game. Proximate the second end 11 are a plurality of support leg members 17. The support leg members 17 are secured to the body 12 utilizing suitable durable techniques and extend outward therefrom. The support leg members 17 are operable to maintain the body 12 in a substantially vertical position. While no particular quantity of support leg members 17 are required, good results have been achieved utilizing either three or four support leg members 17.

A control unit 30 is mounted to the body 10 proximate second end 11. The control unit 30 includes a central processing unit(not illustrated herein) that contains the necessary electronics to store, receive, transmit and manipulate data. The control unit 30 includes a laser emitter 40 that is operable to project a visible laser beam that appear superposed across the surface of the field 99. The visible laser beam of the laser emitter 40 is projected across the surface of the field in order to provide a visual indicator as to the exact location that must be reached in order to achieve a first down during play of a game of football. While various laser light emissions could be utilized, it is desired within the scope of the present invention that the laser emitter 40 emit visible wavelengths including red which has a 632.8 nm wavelength, green (543.5 nm wavelength), yellow (594.1 nm wavelength) and/or orange (604.6, 611.9 nm wavelength). The aforementioned wavelengths for the laser emitter 40 are desired due to their visibility and ability to be seen on a field of play that is typically green. Further as football can be played in adverse conditions such as but not limited to rain or snow, the aforementioned wavelengths are desirable in these adverse conditions. The laser emitter 40 is configured to produce a wide beam of light so as to improve the visibility and ability to identify the location of the position required to be reach to achieve a first down. While no particular width is required, good results have been achieved utilizing a laser emitter 40 that is configured to produce a visible laser beam that is approximately three to four inches in width.

The sports field marking system 100 further includes a second first down marking pole 50. The second first down marking pole 50 is placed on the opposing side of the field 99 and in axial alignment with the first down marker pole 10. The second first down marking pole 50 is manufactured similarly to the first down marking pole 10 having a body 52 that is elongated in manner and manufactured from a suitable durable material such as plastic or fiberglass. A display screen 51 encased in housing 56 is superposed the body 52 and includes a dual-sided projection (only one side has been illustrated herein). The body 52 includes a plurality of support leg members 57 that are secured thereto and extend angularly outward therefrom so as to maintain the body 52 is a substantially vertical position on a field 99. A controller 60 is present having a central processing unit (not illustrated herein) that includes the necessary electronics operable to store, receive, transmit and manipulate data. The controller 60 further includes a laser emitter 70 that is operable in a first mode and a second mode. In a first mode the laser emitter 70 is operable to only receive the visible laser beam emitted from the first down marker pole 10. In a second mode, the laser emitter 70 is operable to emit the same visible laser beam across the surface of the field. In the second mode, the laser emitter 70 functions as a back up projection in the event of a failure of the laser emitter 40 secured to the first down marker pole 10. The laser emitter 70 is configured to emit a laser beam that is equivalent in width to the laser emitter 40 and further is operable to produce a laser light beam having the same wavelengths.

Referring in particular to FIG. 1 herein, the down display marker pole 80 is illustrated therein. The down display marker pole 80 includes a body 82 that is hollow and elongated in manner having a first end 83 and a second end 84. A plurality of support leg members 87 are mounted proximate the first end 83 and extend angularly outward therefrom and are operable to maintain the down display marker pole 80 in a substantially vertical position. Superposed the body 82 proximate end 84 is display screen 90. Display screen 90 is a conventional LCD display screen and while only one side is illustrated herein, the display screen 90 is a dual sided display screen. The display screen 90 is contained in housing 92 and while illustrated being annular in shape herein, it is contemplated within the scope of the present invention that the display screen 90 could be formed in various different shapes. The down display marker 80 includes controller 95 that has a conventional central processing unit (not illustrated herein) that is operable to store, receive, transmit and manipulate data. The controller 95 functions to provide operation of the first laser rangefinder 110 and the second laser rangefinder 120. The first laser rangefinder 110 is operable to utilize a laser pulse and the time of flight principle in order to determine the location of an exemplary football that has been place in axial alignment therewith. The down display marker pole 80 is placed in axial alignment with the exemplary football 98 subsequent each down of play. The first laser rangefinder 110 is then utilized to ensure the position and alignment of the down display marker pole 80 with the exemplary football. The second laser rangefinder 120 is located such that the direction is towards the first down marker pole 10 when the sports field marking system 100 is being utilized on a field 99. The second laser rangefinder 120 utilizes a laser beam pulse and time of flight calculation to determine the distance intermediate the first down marker pole 10 and the down display marker pole 80 that are in axial alignment on field 90 along sideline 97. This distance is calculated by the controller 95 and subsequently displayed on display screen 90. The distance measured by the second laser rangefinder 120 is the distance required to be achieved by an offensive team in order to obtain a first down. It is contemplated within the scope of the present invention that the distance required to obtain a first down could be transmitted to and displayed on any of the display screens discussed herein. Additionally the down display marker pole 80 is configured to maintain and display the current down of play. It is contemplated within the scope of the present invention that the current down of play could be input via the controller 95 or through other suitable techniques and/or remote devices. The second laser rangefinder 120 further functions to assist a referee or other game official in the placement of the first down marker pole 10 in its initial position so that the first down marker pole 10 can be placed exactly ten yards forward of the down display marker pole 80.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A sports field marking system operable to provide location of a football and the distance required to achieve a first down comprising:

a first down marker pole, said first down marker pole located on a sideline of a football field, said first down marker pole having a body, said body being elongated in manner and having a first end and a second end, said first down marker pole further having a control unit, said control unit having a central processing unit, said first down marker further having mounted therein a laser emitter, said laser emitter being operably coupled to said controller;

a second first down marker pole, said second first down marker pole being located on an opposing sideline of a football field in axial alignment with said first down marker pole, said second first down marker pole being elongated in manner and having a first end and a second end, said second first down marker pole having a controller, said controller further including a central processing unit, said second first down marker pole further including laser emitter;

a down display marker pole, said down display marker pole being located on a sideline of a football field in axial alignment with the first down marker pole, said down display marker pole being elongated in manner and having a first end and a second end, said down display marker pole further having a controller, said controller having the necessary electronics to store, transmit, receive and manipulate data, said down display marker pole having a first laser rangefinder, said first laser rangefinder operable to detect a location of a football on a field ensuing the down display marker pole being placed in axial alignment therewith; and wherein the laser emitter of said first down marker pole is operable to display a visible light beam across the field so as to provide a visual indicator for a location that a football must be moved past in order to achieve a first down during play of a football game.

2. The sports field marking system as recited in claim 1, wherein said down display marker pole further includes a second laser rangefinder, said second laser rangefinder directionally oriented towards said first down marker pole, said second laser rangefinder operable to measure a distance between said down display marker pole and said first down marker pole.

3. The sports field marking system as recited in claim 2, wherein said laser emitter of said first down marker pole is configured to project a visible light beam across a field that is approximately three inches in width.

4. The sports field marking system as recited in claim 3, wherein said first down marker pole further includes a display screen.

5. The sports field marking system as recited in claim 1, wherein said down display marker pole further includes a display screen, said display screen being dual-sided.

6. The sports field marking system as recited in claim 5, wherein the laser emitter of said second first down marker pole is operable in a first mode and a second mode, wherein in said first mode the laser emitter is configured to receive a light beam from the laser emitter of said first down marker pole.

7. The sports field marking system as recited in claim 3, wherein the light beam projected by the laser emitter mounted to said first down marker pole is selected from one of the following wavelengths: 632.8 nm, 543.5 nm, 594.1 nm or 604.6 nm.

8. A sports field marking system operable to be utilized in a game of football wherein the sports field marking system is configured to measure and provide indication of the location required to achieve a first down comprising:

a first down marker pole, said first down marker pole located on a sideline of a football field, said first down marker pole having a body, said body being elongated in manner and having a first end and a second end, said first down marker pole including a display screen proximate said second end, said first down marker pole further having a control unit, said control unit having a central processing unit, said first down marker further having mounted therein a laser emitter, said laser emitter being operably coupled to said controller;

a second first down marker pole, said second first down marker pole being located on an opposing sideline of a football field in axial alignment with said first down marker pole, said second first down marker pole being elongated in manner and having a first end and a second end, said second first down marker having a display screen proximate said second end, said second first down marker pole having a controller, said controller further including a central processing unit, said second first down marker pole further including laser emitter;

a down display marker pole, said down display marker pole being located on a sideline of a football field in axial alignment with the first down marker pole, said down display marker pole being elongated in manner and having a first end and a second end, said down display marker pole further having a controller, said controller having the necessary electronics to store, transmit, receive and manipulate data;

a first laser rangefinder, said first laser rangefinder being mounted to said down display marker pole, said first laser rangefinder operable to detect a location of a football on a field ensuing the down display marker pole being placed in axial alignment therewith;

a second laser rangefinder, said second laser rangefinder being mounted to said down display marker pole, said second laser rangefinder directionally oriented towards said first down marker pole, said second laser rangefinder operable to measure a distance between said down display marker pole and said first down marker pole; and wherein the laser emitter of said second first down marker pole is operable in a first mode and a second mode.

9. The sports field marking system as recited in claim 8, wherein in said first mode, said laser emitter of said second first down marker pole is configured to receive a projected visible light beam from said first down marker pole.

10. The sports field marking system as recited in claim 9, wherein the light beam projected by the laser emitter mounted to said first down marker pole is selected from one of the following wavelengths: 632.8 nm, 543.5 nm, 594.1 nm or 604.6 nm.

11. The sports field marking system as recited in claim 10, wherein said down display marker pole further including a display screen, said display screen having a first side and a second side, said display screen configured to provide a current down of play and a distance between the down display marker pole and the first down marker pole.

12. The sports field marking system as recited in claim 10, wherein the visible light beam projected by the first down marker pole is approximately three inches in width.

13. The sports field marking system as recited in claim 12, and further including a plurality of support leg members, said support leg members being mounted to said first down marker pole, said second first down marker pole and said down display marker pole.

14. The sports field marking system as recited in claim 13, wherein the display screen on said first down marker pole is a dual sided LCD screen.

15. A sports field marking system operable to be utilized in a game of football wherein the sports field marking system is configured to provide a visible light beam across a football field so as to provide a location where a football must be advanced to in order to achieve a first down comprising:

a first down marker pole, said first down marker pole located on a sideline of a football field, said first down marker pole having a body, said body being elongated in manner and having a first end and a second end, said first down marker pole including a display screen proximate said second end, said first down marker pole further having a control unit, said control unit having a central processing unit, said first down marker further having mounted therein a laser emitter, said laser emitter being operably coupled to said controller;

a second first down marker pole, said second first down marker pole being located on an opposing sideline of a football field in axial alignment with said first down marker pole, said second first down marker pole being elongated in manner and having a first end and a second end, said second first down marker having a display screen proximate said second end, said second first down marker pole having a controller, said controller further including a central processing unit, said second first down marker pole further including laser emitter;

a down display marker pole, said down display marker pole being located on a sideline of a football field in axial alignment with the first down marker pole, said down display marker pole being elongated in manner and having a first end and a second end, said down display marker pole further having a controller, said controller having the necessary electronics to store, transmit, receive and manipulate data, wherein said down display marker pole further including a display screen, said display screen having a first side and a second side, said display screen configured to provide a current down of play and a distance between the down display marker pole and the first down marker pole;

a plurality of support leg members, said support leg members being mounted to said first down marker pole, said second first down marker pole and said down display marker pole;

a first laser rangefinder, said first laser rangefinder being mounted to said down display marker pole, said first laser rangefinder operable to detect a location of a football on a field ensuing the down display marker pole being placed in axial alignment therewith;

a second laser rangefinder, said second laser rangefinder being mounted to said down display marker pole, said second laser rangefinder directionally oriented towards said first down marker pole, said second laser rangefinder operable to measure a distance between said down display marker pole and said first down marker pole; and wherein the laser emitter of said second first down marker pole is operable in a first mode and a second mode.

16. The sports field marking system as recited in claim 15, wherein the light beam projected by the laser emitter mounted to said first down marker pole is selected from one of the following wavelengths: 632.8 nm, 543.5 nm, 594.1 nm or 604.6 nm.

17. The sports field marking system as recited in claim 16, wherein the visible light beam projected by the first down marker pole is approximately three inches in width.

* * * * *